US011269374B2

(12) United States Patent
Rogers et al.

(10) Patent No.: US 11,269,374 B2
(45) Date of Patent: Mar. 8, 2022

(54) ELECTRONIC DEVICE WITH A COVER ASSEMBLY HAVING AN ADHESION LAYER

(71) Applicant: Apple Inc., Cupertino, CA (US)

(72) Inventors: Matthew S. Rogers, San Jose, CA (US); Manish Mittal, San Jose, CA (US); Marta M. Giachino, Palo Alto, CA (US); Sawako Kamei, San Jose, CA (US)

(73) Assignee: APPLE INC., Cupertino, CA (US)

( * ) Notice: Subject to any disclaimer, the term of this patent is extended or adjusted under 35 U.S.C. 154(b) by 92 days.

(21) Appl. No.: 16/882,361

(22) Filed: May 22, 2020

(65) Prior Publication Data

US 2021/0072789 A1 Mar. 11, 2021

Related U.S. Application Data

(60) Provisional application No. 62/994,616, filed on Mar. 25, 2020, provisional application No. 62/899,042, filed on Sep. 11, 2019.

(51) Int. Cl.
*G06F 1/16* (2006.01)
*H05K 5/00* (2006.01)
*H05K 7/00* (2006.01)
*G02B 1/14* (2015.01)

(52) U.S. Cl.
CPC ............. *G06F 1/1609* (2013.01); *G02B 1/14* (2015.01)

(58) Field of Classification Search
CPC .... G06F 1/1609; G06F 1/1601; G06F 1/1633; G06F 1/1637; G02B 1/14; G02B 1/115; G02B 1/11; G02B 1/111; G02B 1/113; G02B 1/10
See application file for complete search history.

(56) References Cited

U.S. PATENT DOCUMENTS

| 3,713,877 A | 1/1973 | Kirchner et al. |
| 3,736,171 A | 5/1973 | Kirchner |
| 3,809,574 A | 5/1974 | Duffy et al. |
| 3,859,714 A | 1/1975 | DeLuca |
| 4,043,638 A | 8/1977 | Kaufmann |
| 4,339,300 A | 7/1982 | Noble |

(Continued)

FOREIGN PATENT DOCUMENTS

| CN | 1706030 | 12/2005 |
| CN | 101193744 | 6/2008 |

(Continued)

OTHER PUBLICATIONS

Barbour JD et al., "The mechanical properties of alumina films formed by plasma deposition and by ion irradiation of sapphire," Nuclear Instruments & Methods in Physics Research, Section—B:Beam Interactions with Materials and Atoms, Elsevier, Amsterdam, NL, vol. 166-167, May 1, 2000, pp. 140-147.

(Continued)

*Primary Examiner* — Anthony M Haughton
(74) *Attorney, Agent, or Firm* — Brownstein Hyatt Farber Schreck, LLP

(57) ABSTRACT

A cover assembly for an electronic device has a cover member including a glass ceramic material. An adhesion layer couples an interior coating to the cover member. The adhesion layer includes an oxide-based layer, such as a silicon oxide-based layer, and a coupling agent.

20 Claims, 13 Drawing Sheets

(56) References Cited

U.S. PATENT DOCUMENTS

| | | |
|---|---|---|
| 4,675,089 A | 6/1987 | Lory et al. |
| 5,508,092 A | 4/1996 | Kimock et al. |
| 5,935,723 A | 8/1999 | Borden |
| 5,942,343 A | 8/1999 | Chen |
| 6,012,303 A | 1/2000 | Axelson et al. |
| 6,440,242 B1 | 8/2002 | Fukazawa |
| 6,475,820 B2 | 11/2002 | Nakajima et al. |
| 6,528,123 B1 | 3/2003 | Cadden et al. |
| 6,627,319 B2 | 9/2003 | Jacquiod et al. |
| 6,649,494 B2 | 11/2003 | Tamura et al. |
| 6,827,251 B2 | 12/2004 | Masuda |
| 6,829,270 B2 | 12/2004 | Suzuki et al. |
| 6,916,542 B2 | 7/2005 | Buhay et al. |
| 6,962,759 B2 | 11/2005 | Buhay et al. |
| 7,112,359 B2 | 9/2006 | Dhar et al. |
| 7,125,926 B2 | 10/2006 | Satoh et al. |
| 7,244,520 B2 | 7/2007 | Kumakura et al. |
| 7,311,961 B2 | 12/2007 | Finley et al. |
| 7,584,689 B2 | 9/2009 | Jones et al. |
| 7,592,629 B2 | 9/2009 | Lee et al. |
| 7,664,469 B2 | 2/2010 | Hutchison |
| 7,738,187 B2 | 6/2010 | Pazidis et al. |
| 7,793,580 B2 | 9/2010 | Jones et al. |
| 7,796,232 B2 | 9/2010 | Park et al. |
| 7,803,451 B2 | 9/2010 | Lee |
| 7,966,785 B2 | 6/2011 | Zadesky et al. |
| 7,998,586 B2 | 8/2011 | Lu et al. |
| 8,015,970 B2 | 9/2011 | Klun et al. |
| 8,021,758 B2 | 9/2011 | Sambasivan et al. |
| 8,025,004 B2 | 9/2011 | Jones et al. |
| 8,031,174 B2 | 10/2011 | Hamblin et al. |
| 8,055,003 B2 | 11/2011 | Mittleman et al. |
| 8,133,599 B2 | 3/2012 | Lu et al. |
| 8,450,607 B2 | 5/2013 | Du et al. |
| 8,492,242 B2 | 7/2013 | Yokota et al. |
| 8,551,283 B2 * | 10/2013 | Pakula ............... G02B 7/02 156/312 |
| 8,611,077 B2 * | 12/2013 | Sanford ............ H01L 27/1255 361/679.21 |
| 8,652,658 B2 | 2/2014 | Tatartchenko et al. |
| 8,685,490 B2 | 4/2014 | Lu et al. |
| 8,728,634 B2 | 5/2014 | Medwick et al. |
| 8,790,796 B2 | 7/2014 | Buhay et al. |
| 8,968,058 B2 | 3/2015 | Kerpich et al. |
| 8,974,924 B2 | 3/2015 | Weber |
| 9,114,487 B2 | 8/2015 | Kiple et al. |
| 9,115,030 B2 | 8/2015 | Drazenovic |
| 9,125,298 B2 * | 9/2015 | Russell-Clarke ....... G06F 3/045 |
| 9,231,155 B2 | 1/2016 | Kuraoka et al. |
| 9,369,553 B2 | 6/2016 | Zahler et al. |
| 9,377,912 B2 | 6/2016 | Joyce et al. |
| 9,617,639 B2 | 4/2017 | Beckmann et al. |
| 9,718,249 B2 | 8/2017 | Kwong |
| 9,745,662 B2 | 8/2017 | Memering et al. |
| 9,750,150 B2 | 8/2017 | Beckmann et al. |
| 9,946,119 B2 * | 4/2018 | Fujita ................ G06F 1/1637 |
| 2001/0002145 A1 * | 5/2001 | Lee ................. G02F 1/133308 349/58 |
| 2003/0012936 A1 * | 1/2003 | Draheim ............. C09J 153/00 428/216 |
| 2003/0228476 A1 | 12/2003 | Buhay et al. |
| 2004/0102229 A1 | 5/2004 | Hutchison |
| 2006/0162849 A1 | 7/2006 | Han |
| 2007/0048526 A1 | 3/2007 | Hoffman et al. |
| 2007/0224357 A1 | 9/2007 | Buhay et al. |
| 2008/0139885 A1 | 6/2008 | Knapp |
| 2009/0090241 A1 | 4/2009 | Julbe et al. |
| 2009/0263651 A1 | 10/2009 | Cook |
| 2010/0027383 A1 | 2/2010 | Suzuki et al. |
| 2010/0124642 A1 | 5/2010 | Lu et al. |
| 2012/0020002 A1 * | 1/2012 | Mathew ............... G06F 1/1601 361/679.27 |
| 2012/0048083 A1 | 3/2012 | Schwerdtfeger et al. |
| 2012/0069517 A1 * | 3/2012 | Prest ................. G02F 1/13439 361/679.56 |
| 2013/0082358 A1 | 4/2013 | Aida et al. |
| 2013/0236699 A1 | 9/2013 | Prest et al. |
| 2013/0344321 A1 | 12/2013 | McSporran et al. |
| 2014/0087160 A1 | 3/2014 | McSporran et al. |
| 2014/0087179 A1 | 3/2014 | Takano et al. |
| 2014/0116329 A1 | 5/2014 | Chaudhari |
| 2014/0193606 A1 | 7/2014 | Kwong |
| 2014/0355126 A1 | 12/2014 | Gutierrez et al. |
| 2015/0044447 A1 | 2/2015 | Henley |
| 2015/0077624 A1 * | 3/2015 | Havskjold ............ G01J 1/4204 348/373 |
| 2015/0331444 A1 * | 11/2015 | Rappoport ........... G06F 1/1637 362/249.02 |
| 2019/0041909 A1 | 2/2019 | Pakula et al. |

FOREIGN PATENT DOCUMENTS

| | | |
|---|---|---|
| CN | 102400213 | 4/2012 |
| CN | 102549203 | 7/2012 |
| CN | 102723265 | 10/2012 |
| DE | 69612997 T2 | 9/2001 |
| DE | 112004001032 | 5/2006 |
| JP | 02066159 | 3/1990 |
| JP | 09008690 | 1/1997 |
| JP | 2004085231 | 3/2004 |
| JP | 2006275526 | 10/2006 |
| JP | 2006276617 | 10/2006 |
| JP | 2008111984 | 5/2008 |
| JP | 2009204404 | 9/2009 |
| TW | M278556 | 10/2005 |
| TW | I261247 | 9/2006 |
| TW | 200948734 | 12/2009 |
| TW | 201111527 | 4/2011 |
| TW | M438642 | 10/2012 |
| WO | WO97/20963 | 6/1997 |
| WO | WO02/054718 | 7/2002 |
| WO | WO2009/025842 | 2/2009 |
| WO | WO2012/088209 | 6/2012 |
| WO | WO2013/134159 | 9/2013 |
| WO | WO2014/126777 | 9/2014 |

OTHER PUBLICATIONS

Chaudhari, P. et al., Heteroepitaxial Silicon Film Growth at 600C From an Al-Si Eutectic Melt, pp. 5368-5371, Mar. 19, 2010, Thin Solid Films 518, Elsevier, US.

Feng et al., "Strengthening sapphire at elevated temperatures b SiO2 films," Applied Surface Science, Elsevier, Amsterdam, NL, vol. 253, No. 12, Mar. 13, 2007, pp. 5365-5367.

Juropol's 2 Sapphire Crystal Ingot Specification (2014): http://www.juropol.eu/_files/pdf/2_inchingot_Specification_juropol.pdf.

Kirkpatrick A et al., "Effect of Ion Implantation on the Strength of Sapphire at 300-600° C.," Journal of Materials Science, Kluwer Academic Publishers, Dordrecht, vol. 36, No. 9, May 1, 2001, pp. 2195-2201.

Klein, Claude et al., "Flexural strength of sapphire: Weibull statistical analysis of stressed area, surface coating, and polishing procedure effects," Journal of Applied Physics, American Institute of Physics, vol. 96, No. 6, Jan. 1, 2004, 8 pages.

Kobrin, P.H et al., "Compressive thin films for increased fracture toughness," Proceedings of SPIE, vol. 683, Jan. 1, 1986-Aug. 19, 1986, 5 pages.

Liu, C.M. et al., "The effect of annealing, precipitation-strengthening, and compressive coating processes on sapphire strength," Materials Science and Engineering A: Structural Materials: Properties, Microstructure & Processing, Lausanne, Switzerland, vol. 420, No. 1-2, Mar. 25, 2006, 8 pages.

Morris, Jr., J.L., "A Survey of Materials Science I. Structure," Chapter 4, pp. 79-109, Fall 2007.

Patscheider, Jorg et al., "Plasma-Induced Deposition of Thin Films of Aluminum Oxide," Plasma Chemistry and Plasma Processing, Plenum Press, New York, US, vol. 12, No. 2, Jun. 1, 1992, 17 pages.

(56) References Cited

OTHER PUBLICATIONS

Seman, Michael T. et al., "An Analysis of the Deposition Mechanisms involved during Self-Limiting Growth of Aluminum Oxide by Pulsed PEVCD," Chemical Vapor Deposition, Wiley-VCH Verlag, Weinheim, Germany, vol. 14, No. 9/10, Sep. 1, 2008, 7 pages.

Simpson, Todd W. et al., "Kinetics of the Amorphous → γ → β Transformations in Aluminum Oxide: Effect of Crystallographic Orientation," Journal of the American Ceramic Society, vol. 81, No. 1, Jan. 1, 1998, 6 pages.

Schmid et al., Effect of Crystal Orientation and Temperature on the Strength of Sapphire, Journal of the American Ceramic Society, 80, 1998, p. 885-893.

\* cited by examiner

ELECTRONIC DEVICE WITH A COVER ASSEMBLY HAVING AN ADHESION LAYER

CROSS REFERENCE TO RELATED APPLICATION(S)

This application is a non-provisional application of and claims the benefit of U.S. Provisional Patent Application No. 62/899,042, filed Sep. 11, 2019, and titled "Electronic Device with a Cover Assembly Having an Adhesion Layer," and of U.S. Provisional Patent Application No. 62/994,616, filed Mar. 25, 2020, and titled "Electronic Device with a Cover Assembly Having an Adhesion Layer," the disclosure of each of which is hereby incorporated by reference herein in its entirety.

FIELD

The described embodiments relate generally to use of an adhesion layer including one or more oxide materials to improve the adhesion strength between a cover member and a coating. More particularly, embodiments relate to electronic devices including an adhesion layer between an interior coating and a cover member including a glass ceramic material.

BACKGROUND

An interior surface of a cover glass for an electronic device may be coated to provide a decorative effect. For example, an opaque coating may be used to block one or more internal components of the electronic device from view. The opaque coating may be selectively applied to the cover glass to allow viewing of a display.

SUMMARY

The following disclosure is generally related to improving the adhesion between a coating and a cover member for an electronic device, thereby improving the durability of the electronic device. In particular, an adhesion layer as described herein may be used to improve the adhesion between a cover member including a glass ceramic material and the coating. The coating may be an interior coating, such as a polymer-based mask or other cosmetic coating.

In some embodiments, the adhesion layer comprises an oxide-based layer, such as a silicon oxide layer. The adhesion layer may further include a coupling agent such as a silane-based coupling agent. The adhesion layer is typically thin relative to the coating and may be less than 100 nm thick.

The disclosure provides an electronic device comprising a display and an enclosure including a cover assembly. The cover assembly is positioned over the display and comprises a cover member formed from a glass ceramic material, a cosmetic masking layer positioned along an interior surface of the glass ceramic cover member and defining an opening positioned over at least a portion of the display, and an adhesion layer including a silicon-based oxide and forming a bond between the glass ceramic material of the cover member and the cosmetic masking layer.

In addition, the disclosure provides an electronic device comprising an enclosure defining an interior cavity of the electronic device. The enclosure includes a cover assembly comprising a cover member comprising a glass ceramic material, an opaque polymer-based layer along a peripheral interior surface of the cover member, an oxide-based layer between the cover member and the opaque polymer-based layer, and a coupling agent between the oxide-based layer and the opaque polymer-based layer. The electronic device also comprises a display, at least a portion of the display positioned under the cover member and within the interior cavity.

Further, the disclosure provides an electronic device comprising an enclosure including a cover assembly. The cover assembly defines an exterior surface of the electronic device and comprises a glass ceramic cover member, a polymeric layer positioned along an interior surface of the glass ceramic cover member, and an adhesion layer. The adhesion layer comprises an oxide-based layer positioned between the glass ceramic cover member and the polymeric layer and directly adhered to the glass ceramic cover member and a coupling agent directly adhered to each of the oxide-based layer and the polymeric layer.

BRIEF DESCRIPTION OF THE DRAWINGS

The disclosure will be readily understood by the following detailed description in conjunction with the accompanying drawings, wherein like reference numerals designate like elements.

Figure 1A:
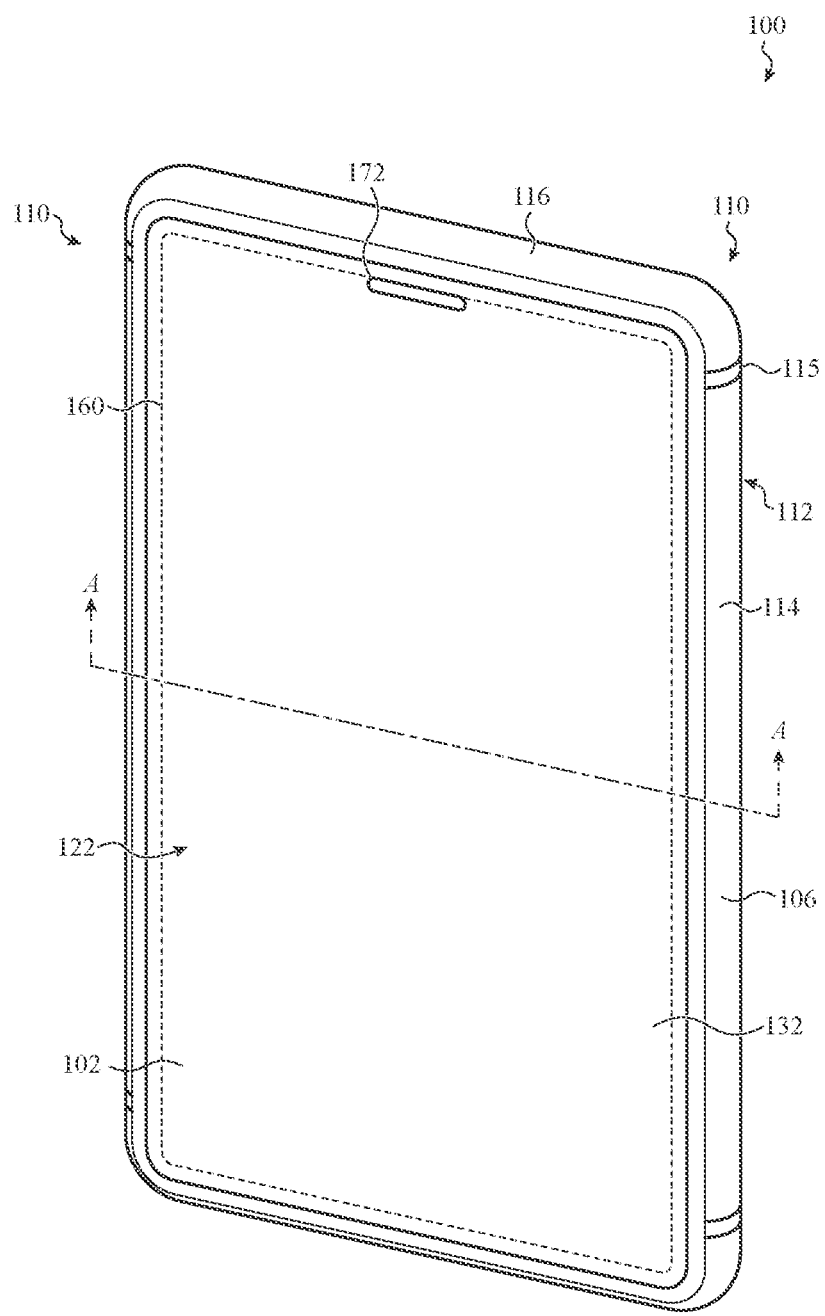
FIG. 1A shows a front view of an example electronic device.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Reference will now be made in detail to representative embodiments illustrated in the accompanying drawings. It should be understood that the following descriptions are not intended to limit the embodiments to one preferred implementation. To the contrary, the described embodiments are intended to cover alternatives, modifications, and equivalents as can be included within the spirit and scope of the disclosure and as defined by the appended claims.

The following disclosure relates to an adhesion layer for improving the adhesion between a coating and a cover member for an electronic device. In some cases, the cover member comprises a glass ceramic material and the adhesion between the glass ceramic material and the coating in the absence of an adhesion layer may be less than for a conventional glass material. An adhesion layer as described herein may therefore improve the durability of the electronic device. The adhesion layer may also provide improved protection against entry of water or particles into the electronic device.

In some cases, the disclosure provides a cover assembly for an electronic device which includes an adhesion layer. By the way of example, the cover assembly comprises a cover member including a glass ceramic material, an interior coating, and an adhesion layer between the cover member and the interior coating. The adhesion layer may comprise an oxide material, which is typically in the form of a layer. The adhesion layer may further comprise a coupling agent. In some cases, the interior coating provides a cosmetic effect and may be referred to as a cosmetic coating. The interior coatings described herein typically comprise a polymer and may also comprise a colorant.

In addition, the disclosure provides an electronic device including the cover assembly described herein. The electronic device may include a display and in some cases the cover assembly may be provided over the display. Each of the cover member and the adhesion layer may be transparent to visible light. The coating may be opaque in order to mask at least a portion of an interior device component. In some cases, the coating may define an opening through which the display may be viewed.

The cover member and the cover assembly are typically coupled to another component of the enclosure. In some cases, a coupling structure may be formed between the cover member and a housing member of the enclosure, with the coupling structure defined by the adhesion layer, the interior coating layer, and an adhesive positioned between the interior coating layer and the housing member.

The disclosure also provides methods for making a cover assembly including an adhesion layer. In some cases, a method includes operations of forming an oxide-based layer on a surface of the cover member and applying a coating mixture including a coupling additive to the oxide-based layer. The coupling additive may serve as a precursor for the coupling agent molecules present in the adhesion layer.

These and other embodiments are discussed below with reference to FIGS. 1A-12. However, those skilled in the art will readily appreciate that the detailed description given herein with respect to these figures is for explanatory purposes only and should not be construed as limiting.

FIG. 1A shows a front view of an example electronic device 100 including a cover assembly 122 as described herein. The electronic device 100 may be a mobile telephone (also referred to as a mobile phone). In additional embodiments, the electronic device 100 may be a notebook computing device (e.g., a note book), a tablet computing device (e.g., a tablet), a portable media player, a wearable device, or another type of portable electronic device. The electronic device 100 may also be any other type of electronic product or device.

As shown in FIG. 1A, the electronic device 100 comprises an enclosure 110 including the cover assembly 122. The cover assembly 122 is positioned over a display assembly 160 and may define a transparent portion positioned over the display assembly 160 (indicated by the dashed line in FIG. 1A). The cover assembly 122 may at least partially define an external surface of the electronic device 100, such as a front surface 102 of the electronic device. Typical cover assemblies described herein are thin, typically less than 5 mm in thickness. In some cases, a cover assembly may be less than 3 mm in thickness or less than 1 mm in thickness.

Figure 2:
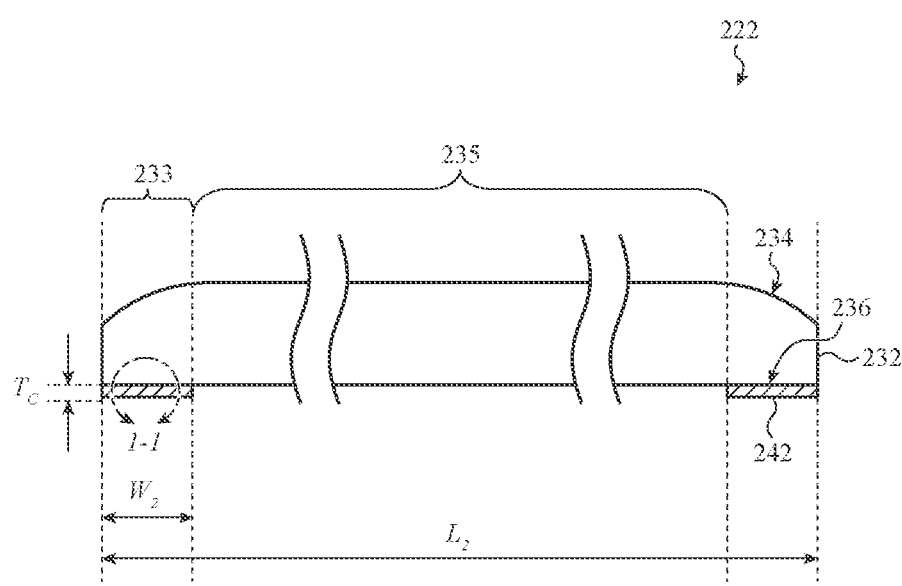
FIG. 2 shows an example of a cover assembly.
Figure 3:
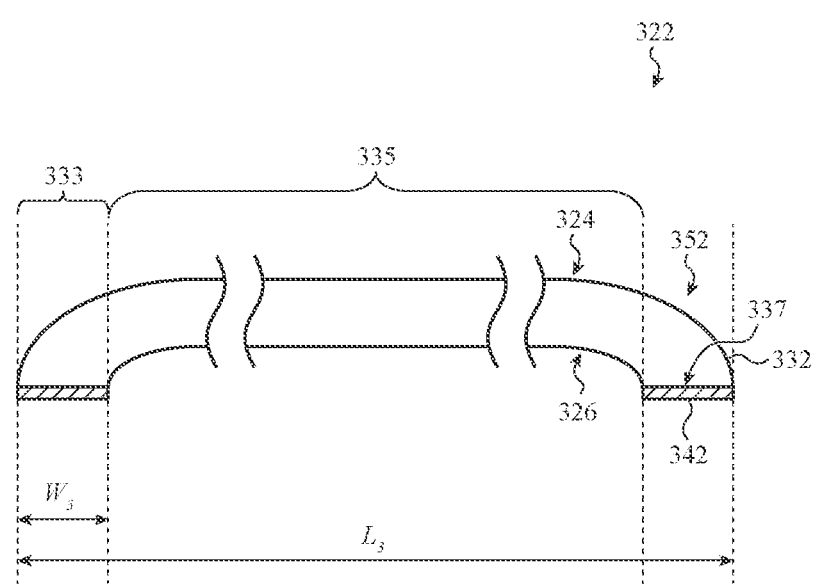
FIG. 3 shows an additional example of a cover assembly.
Figure 10:
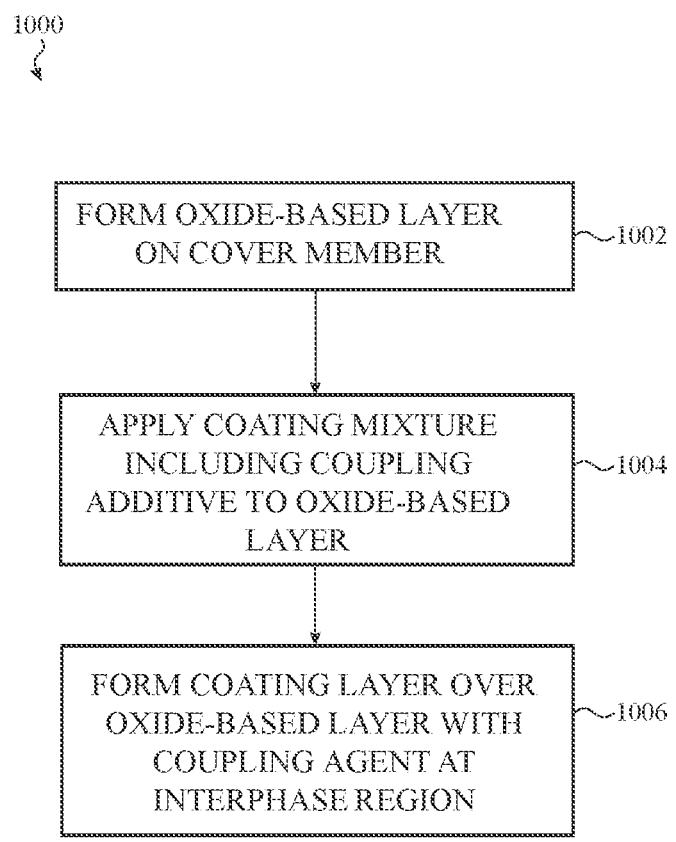
FIG. 10 shows a flow chart of a process for making a cover assembly.

The cover assembly 122 may include a cover member 132 which comprises a glass ceramic material (examples of cover members are also shown in FIGS. 2 and 3). In some cases, the cover member 132 may consist essentially of a glass ceramic material or may be formed from a glass ceramic material. Typically, the glass ceramic material includes a crystalline phase and an amorphous (glass) phase. The cover member may be a glass ceramic-based cover member including at least 50%, 60%, 70%, 80%, 90%, or 95% of the glass ceramic material. A cover member including at least 90% or more of the glass ceramic material may also be simply referred to as a glass ceramic cover member. The additional description of glass ceramic materials provided with respect to FIG. 10 is generally applicable herein and, for brevity, is not repeated here.

The cover member may be generally flat or may be formed to have a curved profile (as shown in FIGS. 2 and 3). In some cases, a cover member as described herein may be included in an all glass ceramic enclosure or an enclosure including combinations of glass ceramic and glass cover members. The enclosure may be multi-faceted. In such cases, the cover member may define one or more surfaces of the enclosure, such as a front surface and a side surface, a rear surface and a side surface, or a front surface, a side surface, and a rear surface. In some aspects, a cover member (such as the cover member 132) included in a cover assembly can have a thickness from about 0.1 mm to 2 mm, from 0.5 mm to 2 mm, from 0.2 mm to 1 mm, or from 100 microns to 500 microns.

The cover assembly 122 typically also includes one or more coatings. For example, an interior coating may be provided along an interior surface of the cover member 132. In some cases, the interior coating may be used to obscure or mask at least a portion of an internal component of the electronic device. Other portions of the internal component, such as an active portion of a display, may be visible rather than masked. Interior coatings are illustrated and described in further detail with respect to FIGS. 2-4. That description is generally applicable herein and for brevity is not repeated here. The cover assembly 122 may also include an exterior coating, such as a smudge-resistant coating provided along an exterior surface of the cover assembly.

As previously described, an adhesion layer may be provided between the cover member 132 and at least a portion of a coating to increase the adhesion strength of the coating. The adhesion layer may comprise an oxide material, such as a silicon oxide. In some cases, the adhesion layer includes an oxide-based layer which may be thin relative to the cover member 132 and the coating (e.g., a cosmetic coating). The adhesion layer may further include a coupling agent which interacts with both the oxide material and the material of the coating. For example, the coupling agent may be silane-based.

As previously discussed, in some cases the adhesion layer may be provided between an interior surface of the cover member and at least a portion of an interior coating. In additional cases, an adhesion layer may also be provided between an exterior surface of the cover member and an exterior coating, such as a smudge-resistant coating. In some embodiments, the adhesion layer may be transparent to visible light. Adhesion layers are illustrated and described in further detail with respect to FIGS. 2-5 and 6B-9. That description is generally applicable herein and for brevity is not repeated here.

Figure 9:
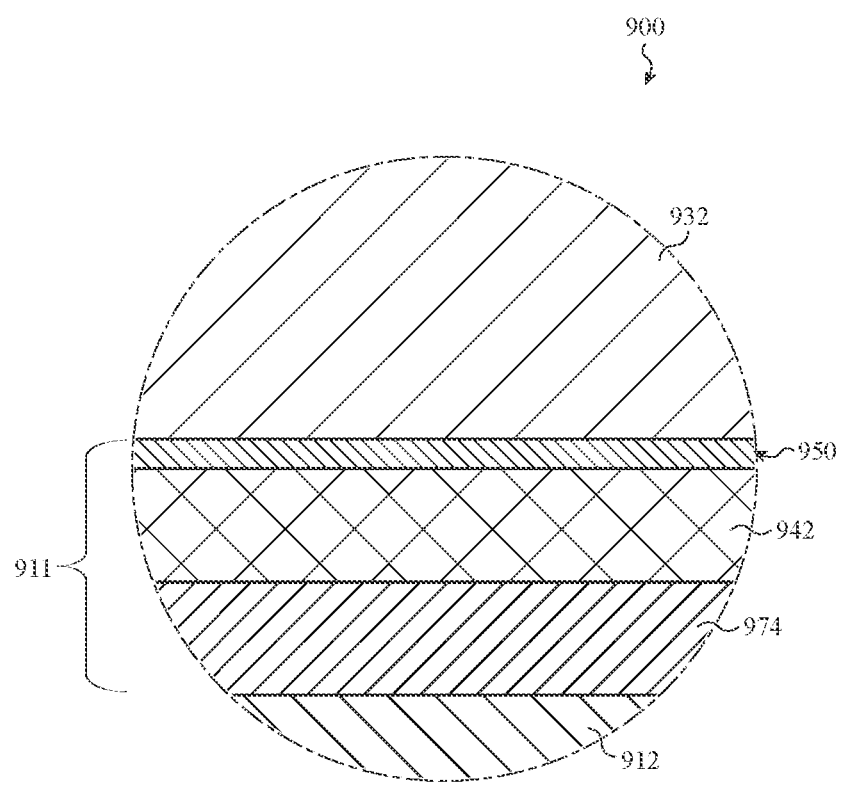
FIG. 9 shows a detail view of a coupling structure between a cover member and a housing member.

In some embodiments, a coupling structure is formed between the cover member 132 and a housing member 112 and the inclusion of the adhesion layer in the cover assembly increases the strength of the coupling structure and the durability of the electronic device 100. As illustrated in FIG. 9, the coupling structure may include the adhesion layer, the coating, and an adhesive between the coating and the housing member. Additional features, such as a fastener or another type of engagement feature may also be used to couple the cover assembly 122 and the cover member 132 to the housing member 112.

Generally, a housing member 112 of the enclosure 110 may include one or more metal members or one or more glass members. As shown in FIG. 1A, the housing member 112 is formed from a series of metal segments (114, 116) that are separated by polymer or dielectric segments 115 that provide electrical isolation between adjacent metal segments. One or more of the metal segments (114, 116) may be coupled to internal circuitry of the electronic device 100 and may function as an antenna for sending and receiving wireless communication. The housing member 112 may at least partially define a side surface 106 of the electronic device 100. The housing member 112 may be formed from a metal, a glass, a ceramic, a plastic, or a combination thereof.

The enclosure 110 may at least partially surround the display assembly 160. The display assembly 160 includes a display and may also include a touch sensor, a force sensor, or a combination thereof. The display may be a liquid-crystal display (LCD), a light-emitting diode (LED) display, an LED-backlit LCD display, an organic light-emitting diode (OLED) display, an active layer organic light-emitting diode (AMOLED) display, and the like. A touch sensor may be configured to detect or measure a location of a touch along the exterior surface of the front cover assembly 122 while a force sensor may be configured to detect a force applied along the exterior surface. The touch sensor may be located between the cover assembly 122 and the display. Touch sensors, force sensors, and displays are described in more detail below with respect to FIG. 12 and that description is generally applicable herein.

As shown in FIG. 1A, the cover member 132 defines an opening 172 (which may also be referred to as a hole). In general, an opening may be provided in the cover member 132 or other transparent component to facilitate input to or output from a device component such as a microphone, a camera component, and the like. In the example of FIG. 1A, the opening 172 may provide a speaker port for an earpiece of the electronic device 100. Additional device components are described in more detail below with respect to FIG. 12 and that description is generally applicable herein.

Figure 1B:
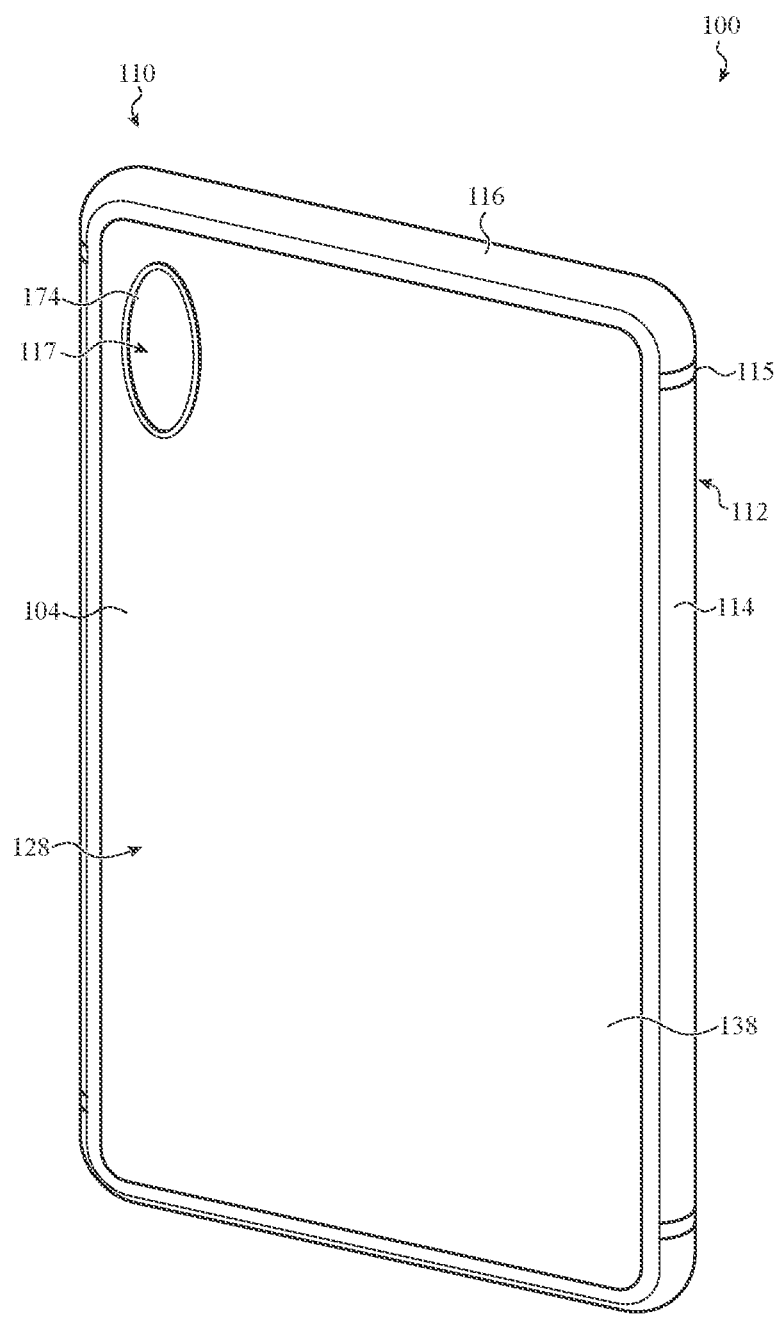
FIG. 1B shows a rear view of the electronic device of FIG. 1A.

FIG. 1B shows an example of a rear view of the electronic device 100 of FIG. 1A. The enclosure 110 further includes a cover assembly 128. The enclosure 110, the housing member 112, the metal segments 114 and 116, and the polymer or dielectric segments 115 are as previously described for FIG. 1A. The cover assembly 128 may define a rear surface 104 of the electronic device 100.

The cover assembly 128 may include a cover member 138. As shown in FIG. 1B, the cover member 138 includes an opening 174 configured to surround a window 117 and one or more camera assemblies may be placed below the window 117. The opening 174 is not limited to the shape shown in FIG. 1B and may be circular, square, or any other desired shape. In other embodiments, the cover member 138 may not include an opening or may include multiple openings. In some cases, the cover member 138 may be formed of similar materials to the cover member 132. The cover member 138 may also be formed of glass, a polymeric material, a ceramic material, or combinations thereof.

Figure 4:
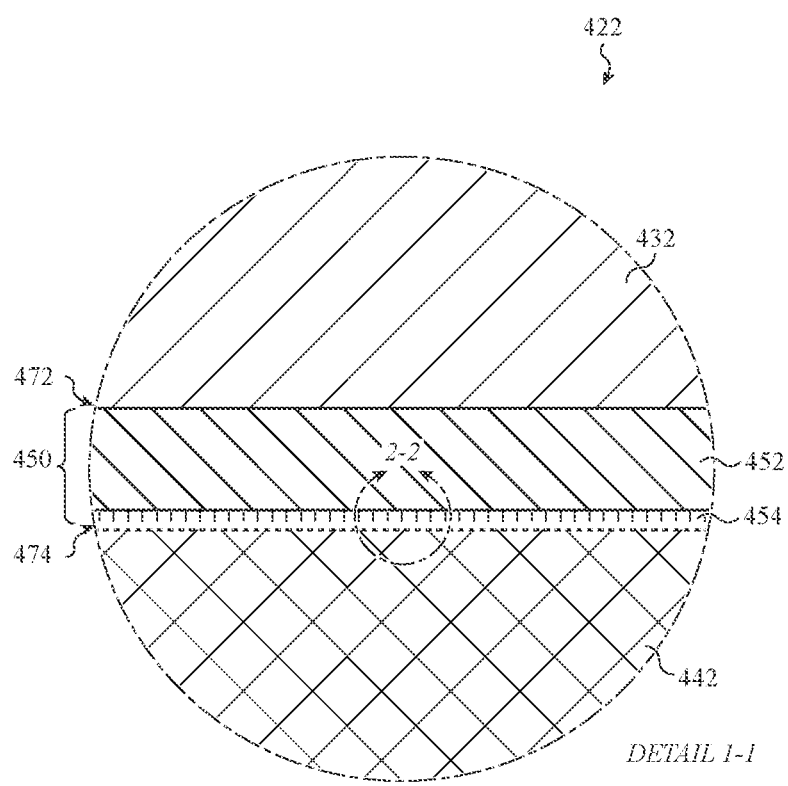
FIG. 4 shows a detail view of a cover assembly including an adhesion layer.
Figure 5:
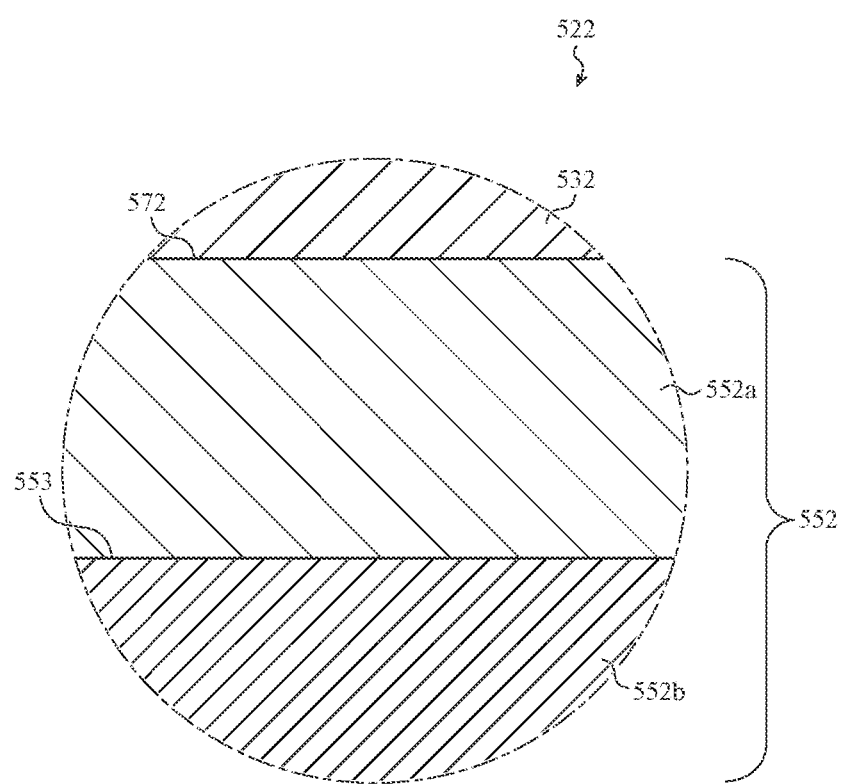
FIG. 5 shows a detail view of an adhesion layer.

FIG. 2 shows a cross-section view of a cover assembly 222 and a cover member 232. For example, the cross-section may be taken along A-A of FIG. 1A. As shown in FIG. 2, the cover assembly 222 includes a cover member 232 and a coating 242 disposed over an interior surface 236 of the cover member 232. A coating disposed over an interior surface of the cover member, such as the coating 242, may also be referred to herein as an interior coating. An adhesion layer (e.g., adhesion layer 450 of FIG. 4) is provided between the cover member 232 and at least a portion of the coating 242. The description of the adhesion layer provided with respect to the detail views of FIGS. 4 and 5 is generally applicable herein and, for brevity, is not repeated here.

The coating 242 may have the form of a layer and may be referred to herein as a coating layer. In some cases, the coating 242 may be configured to provide a decorative or cosmetic effect and may be referred to as a cosmetic layer, a cosmetic coating layer, a decorative layer, or a decorative coating layer. For example, the coating 242 may be configured to impart a particular color to the electronic device. When the coating 242 is sufficiently translucent or opaque it may be used to provide a masking effect and may be referred to as a masking layer, a cosmetic masking layer, or a decorative masking layer. For example, a masking layer may have a transmittance less than a specified value (e.g., less than 50%, less than 40%, less than 30%, less than 20%, or less than 10%). In some cases, the transmittance may be integrated over the spectrum of visible light. As another example, a masking layer may have an optical density greater than a specified value. For example, the optical density of a masking layer 242 may be described by $OD=\log_{10}$ (initial intensity/transmitted intensity) and may be greater than or equal to 1, greater than or equal to 2, or greater than or equal to 3. In some cases, the coating 242 need not provide a decorative effect. For example, the coating 242 may be substantially transparent or clear.

As shown in FIG. 2 the coating 242 has the form of a layer having a thickness $T_C$. The thickness $T_C$ of the coating is not necessarily shown to scale. In some embodiments, the thickness $T_C$ of the coating ranges from 10 microns to 100 microns, 15 microns to 75 microns, 20 microns to 60 microns, or 25 microns to 50 microns. In some embodiments, the thickness Tc of the coating is greater than 10 microns and less than 50 microns. The thickness Tc of the coating may vary from the express examples provided herein.

In some cases, the coating 242 may include sublayers. For example, the coating 242 may comprise from 1 to 100, from 1 to 50, from 1 to 25, from 1 to 10, or from 2 to 10 (sub)layers. When the coating comprises a plurality of sublayers, the sublayers typically form a stack. The sublayers may have substantially the same composition or may differ in composition. Each sublayer may have a thickness from about 2 microns to about 10 microns. A coating 242 including multiple sublayers may also be referred to herein as a multilayer assembly.

As shown in FIG. 2, the coating 242 extends along the interior surface 236 only in a peripheral portion 233 of the cover member. The coating 242 defines a width $W_2$ which is less than a lateral dimension $L_2$ of the cover member 232. The interior surface 236 in the central portion 235 of the cover member 232 is free of the coating. Therefore, the coating 242 defines a central opening (corresponding to the portion of the interior surface 236 which is free of the coating). As illustrated in FIG. 4, the central opening may be placed over a portion of a display assembly. In some cases, the adhesion layer or at least a portion of the adhesion layer may be present on the portion of the interior surface 236 which is free of the coating 242. For example, the oxide-based layer may span the central opening.

In some cases, the coating 242 comprises a polymer. The coating 242 may comprise at least 40%, 50%, 60%, or 70% of the polymer and may therefore be referred to as a polymer-based coating or a polymeric coating. When the coating further comprises a colorant, the polymer may act as a binder for the colorant. The colorant (e.g., a pigment) may be substantially dispersed in a matrix of the polymer. As examples, the polymer may be polyester-based, epoxy-based, urethane-based, or based on another suitable type of polymer or copolymer. The coating 242 may further comprise optional additives such as one or more extenders, diluents, polymerization initiators, and/or stabilizers. In some embodiments, the polymer has a cross-linked structure. When the coating includes multiple sublayers, the polymer of each of the sublayers may have a cross-linked structure.

The coating 242 may be opaque to visible light due at least in part to incorporation of a colorant. The thickness of the coating 242 and the number of layers/sublayers may be adjusted to obtain a desired level of opacity. In some cases, the coating 242 may serve as an opaque layer or a masking layer.

The colorant may comprise a dye, a pigment, or a combination thereof. Further, a colorant may comprise an organic material, an inorganic material, an organometallic material, or a hybrid material. Examples of inorganic pigments include, but are not limited to, carbon-based pigments (e.g., carbon black) and metal based pigments such as oxides (e.g., titanium dioxide, chromium oxide, iron oxides), sulfides, phosphates, and silicates (e.g., ultramarine). Examples of organic pigments include, but are not limited to, azo pigments and phtalocyanine pigments. Examples of organic dyes include, but are not limited to, azo dyes, anthraquinone dyes, and phtalocyanine dyes. In embodiments, the weight percentage of the colorant is from about 5 wt % to about 40 wt %.

In the example of FIG. 2, the exterior surface 234 in the peripheral portion 233 of the cover member 232 defines a curved profile. The interior surface 236 of the cover member 232 defines a substantially planar profile. For example, the interior surface 236 may be planar to within 25 microns, 20 microns, 15 microns, 10 microns, or 5 microns. The thickness of the cover member 232 is greater in the central portion 235 than in the peripheral portion 233. The shape of the cover member 232 may be achieved by machining, molding, hot forming, or a combination thereof.

The example of FIG. 2 is not limiting and the cover members and cover assemblies described herein may have a shape other than the shape shown in FIG. 2. FIG. 3 shows an example of a cross-sectional view of a three-dimensional cover member 332 and cover assembly 322. The coating 342 is disposed over an interior surface 326 of the cover member 332. An adhesion layer is provided between the cover member 332 and at least a portion of the coating 342 (e.g., adhesion layer 450 of FIG. 4). The description of the adhesion layer provided with respect to detail views of FIGS. 4 and 5 is generally applicable herein and, for brevity, is not repeated here.

As shown in FIG. 3, the coating 342 extends along the interior surface 326 only in a peripheral portion 333 of the cover member 332. The interior surface 326 in the central portion 335 of the cover member 332 is free of the coating 342. In some cases, at least a portion of the adhesion layer may be present on the portion of the interior surface 326 which is free of the coating 342.

In the example of FIG. 3, an end 337 of the peripheral portion 333 is not coplanar with a central portion 335 of the cover member 332. By the way of example, the end 337 may define an angle with respect to a plane defined by the central portion 335, such as an angle of 90 degrees or an angle from 80 degrees to 100 degrees. Each of the interior surface 326 and the exterior surface 324 define a curved profile and together the interior surface 326 and the exterior surface 324 define a curved side portion 352 of the cover member 332. In some cases, the curved side portion 352 may function as a flange.

The coating 342 defines a width $W_3$ which is less than a lateral dimension $L_3$ of the cover member 332. The central portion 335 is therefore free of the coating 342. The placement of the coating 342 in FIG. 3 is not limiting and in some cases the coating may extend onto the curved portion of the interior surface 326. The thickness of the coating 342 may be as previously described for FIG. 2 and, for brevity, that description is not repeated here.

FIG. 4 shows a detail view of an adhesion layer 450 between a cover member 432 and an interior coating 442 of a cover assembly 422. For example, FIG. 4 may be an example of detail 1-1 of FIG. 2. As illustrated in FIG. 4, the adhesion layer 450 comprises an oxide-based layer 452 and a coupling agent 454. The oxide-based layer 452 and the coupling agent 454 are depicted schematically and are not necessarily drawn to scale.

The coupling agent 454 helps bond or couple the interior coating 442 to the oxide-based layer 452 by interacting with both the oxide-based layer 452 and the interior coating 442. For example, the coupling agent 454 may be bonded to each of the oxide-based layer 452 and the interior coating 442. The coupling agent 454 may be bonded to the oxide-based layer 452 and/or the interior coating 442 by a chemical bond, such a covalent bond or a hydrogen bond. For example, the interior coating 442 may include a polymer matrix which is chemically bonded to the coupling agent 454. As another example, the coupling agent 454 may interact with the oxide-based layer 452 and/or the interior coating 442 by various types of intermolecular interactions and/or by mechanical interlocking. The coupling agent may be directly adhered to each of the oxide-based layer and the polymeric layer.

Figure 6A:
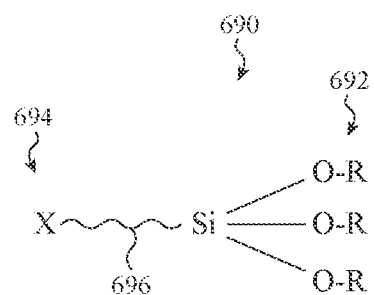
FIG. 6A shows an example of a coupling additive.
Figure 6B:
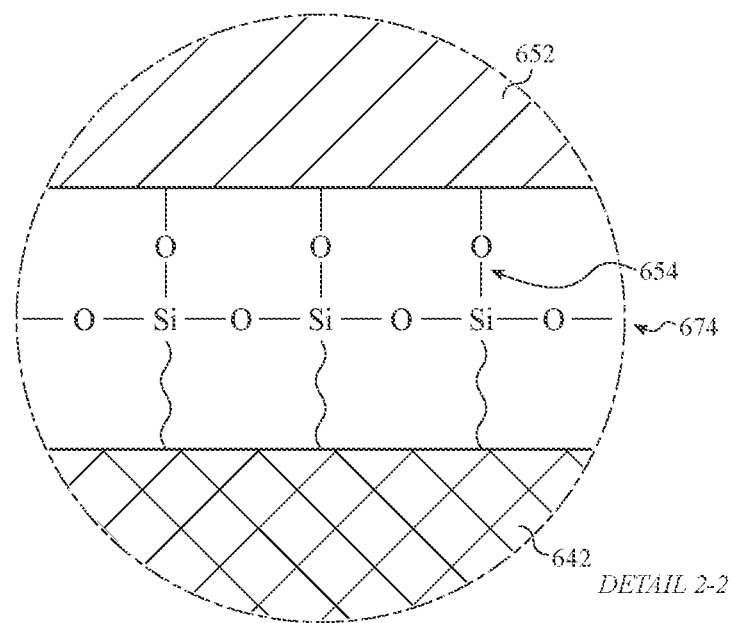
FIG. 6B shows an additional detail view of an adhesion layer.

The coupling agent 454 may have the form of a plurality of individual molecules, of a network of interconnected molecules (as schematically shown in FIG. 6B), or a combination thereof. The coupling agent 454 may be silane-based and derived from a silane-based coupling additive. For example, the coupling agent 454 may include a silicon atom linked to one or more residues of moieties present in the coupling additive. Additional description of coupling additives and coupling agents is provided with respect to FIGS. 6A and 6B. The description of coupling additives and coupling agents provided with respect to FIGS. 6A and 6B is generally applicable here and, for brevity, is not repeated here.

As shown in FIG. 4, the boundary between the oxide-based layer 452 and the interior coating 442 is not sharp, but defines an interphase region 474. Typically, at least some of the coupling agent 454 is located in the interphase region 474. The interphase region 474 may include a combination of molecules of the coupling agent 454 and molecules of the interior coating 442. When the molecules of the interior coating 442 interpenetrate with the coupling agent 454, the coupling agent 454 and the adhesion layer 450 may be between the cover member 432 and at least a portion of the interior coating 442. In some cases, the interphase region 474 may have a thickness from about 0.1 nm to about 10 nm or from about 0.2 nm to about 5 nm.

The oxide-based layer 452 of the adhesion layer 450 may contact the cover member 432 at an interface region 472. In some cases, the cover member 432 may be directly adhered to the oxide-based layer 452. For example, atoms of the cover member 432 may interact with atoms of the oxide-based layer 452 to produce adhesion of the oxide-based layer 452 to the cover member 432, such as through chemical bonds. As an additional example, the boundary between the cover member 432 and the oxide-based layer 452 may be less sharp than is shown in FIG. 4 and may be an interphase region.

The oxide-based layer 452 may be thin relative to the cover member 432 and the interior coating 442. For example, the oxide-based layer 452 may have a thickness from 2 nm to 50 nm, from 5 nm to 20 nm, or from 10 nm to 30 nm. In some cases, the adhesion layer 450 may be transparent to visible light. For example, the adhesion layer 450 may transmit at least 80%, 90%, or 95% of light in the visible spectrum.

The strength of the coupling (or adhesion strength) between the cover member 432 and the coating 442 may be measured by various means. For example, the adhesion strength may be measured by a scrape test (e.g., ASTM D2197), a tape test (e.g., ASTM D3359), or a pull-off test (e.g., ASTM D4541). The adhesion strength between the cover member 432 and the coating 442 when the adhesion layer 450 is included may be greater than the adhesion strength between the cover member 432 and the coating 442 when the adhesion layer 450 is omitted. In some cases, the adhesion strength between the cover member 432 and the coating 442 when the adhesion layer 450 is included may be at least 25% greater, at least 50% greater, at least 75% greater, or at least 100% greater than the adhesion strength between the cover member 432 and the coating 442 when the adhesion layer 450 is omitted.

The protection provided by the electronic device as a whole against entry of water or particles may be measured by various ingress protection tests. For example, the IEC 60529 IP testing standard can be used to determine various ratings for liquids such as water. Such ratings can be used to characterize the extent to which the electronic device is waterproof.

The adhesion layer typically comprises an oxide material, such as a silicon oxide, a metal oxide, an alkaline earth oxide, or the like. As shown in FIG. 4, the adhesion layer includes an oxide-based layer. An oxide-based layer may comprise a relatively large amount of one or more oxide materials, such as at least 50%, 60%, 70%, 80%, 90%, or 95% by weight of the oxide material(s). An oxide-based layer including a relatively high amount of the one or more oxide materials, such as at least 90%, 95%, or 98% by weight of the oxide material(s) may be simply referred to herein as an oxide layer. Relatively small amounts of other elements, such as carbon, hydrogen, nitrogen, and the like may be present in the oxide-based layer as residue(s) from the process for forming the oxide-based layer. For example, in some cases the amount of these residual elements is less than 10%, 5%, or 2%. The oxide-based layer may have an amorphous structure, a crystalline structure, or a combination thereof.

In some cases, the oxide-based layer may predominantly comprise a silicon oxide, such as at least 50%, 60%, 70%, 80%, 90%, 95%, or 98% of the silicon oxide. An oxide-based layer including a relatively high amount of silicon oxide, such as at least 90%, 95%, or 98% by weight of silicon oxide may be simply referred to herein as a silicon oxide-based layer or as a silicon oxide layer. The silicon oxide may be characterized by the formula $SiO_x$, where x may range from about 0.6 to about 2.0, from 1.0 to about 2.0, or 1.5 to 2.0. In some cases, x may be about 2.0. When x is less than 2, the silicon oxide may be referred to as being silicon rich.

In some cases, the oxide-based layer 452 comprises a mixed oxide and may be referred to as a mixed oxide-based layer. For example, the oxide-based layer 452 may comprise a mixed oxide which includes silicon and one or more metals in combination with oxygen. For example, the mixed oxide may comprise aluminum and/or lithium as well as silicon when the glass ceramic material is a lithium aluminosilicate material. When the amount of silicon exceeds the amount of the other metal(s) present in the oxide and the amount of residual elements in the oxide-based layer is relatively small, the mixed oxide may be referred to as a silicon-based oxide and the oxide-based layer may be referred to as a silicon-based oxide layer. As an additional example, the mixed oxide may also comprise zirconium. In some cases, the composition of the oxide layer may be described for convenience in terms of relative ratios of the oxide constituents even though the oxide may be substantially uniform in composition.

In some cases, the oxide-based layer 452 may be substantially uniform in composition. In other cases, the oxide-based layer 452 may vary in composition from the interface region 472 to the interphase region 474. For example, the composition of the oxide-based layer 452 near the interphase region 474 may be selected to have a relatively high amount of silicon and may approach, or substantially match the composition of a silicon oxide. A combination of a relatively high amount of silicon with oxygen near the interphase region 474 may facilitate adhesion between the coupling agent 454 and the oxide-based layer 452. The composition of the oxide-based layer 452 near the interface region 472 may be selected to more closely match the composition, the thermal expansion and/or another property of the glass ceramic material. In some cases, the composition of the oxide-based layer may substantially match the composition of the glass ceramic material. For example, a mixed oxide-based layer may include a greater amount of the metal (e.g., aluminum) near the interface region 472 than near the interphase region 474.

In some embodiments, an oxide-based layer 452 may include a substantially continuous variation in composition between the region 472 and the region 474. For example, the oxide-based layer 452 may be a graded coating (or gradient coating). In additional embodiments, an oxide-based layer may include sublayers which differ in composition. FIG. 5 depicts an example of a cover assembly 522 where the oxide-based layer 552 includes two sub-layers 552a and 552b. The sublayers 552a and 552b may differ in composition and define an interface region 553 between the sublayers. For example, the sublayer 552a, which is adjacent the interface region 572 between the oxide-based layer 552 and the cover member 532, may have a lower silicon content and a higher metal content than the sublayer 552b.

The composition and/or the structure of the oxide-based layer 452 or 552 may depend at least in part on the process by which it is made. The description of processes for making oxide-based layers provided with respect to FIG. 10 is generally applicable herein and, for brevity, will not be repeated here.

FIG. 6A shows an example of a coupling additive 690 and FIG. 6B shows a detail view of an example of a coupling agent 654. For example, FIG. 6B may be an example of detail 2-2 of FIG. 4 and is greatly enlarged to show the coupling agent 654. As described in more detail with respect to FIG. 10, the coupling agent 654 may be formed by applying a coating mixture including a coupling additive to the oxide-based layer and then forming the coating (e.g., a decorative coating).

In some cases, the coupling additive 690 is a silane-based coupling additive that includes four moieties chemically bonded to a silicon atom, as schematically shown in FIG. 6A. In general, the coupling additive 690 may include one or more functional groups 692 which interact with the oxide-based layer 652 or hydroxyl groups formed on the oxide-based layer. The functional groups 692 may be hydrolyzable. In the example of FIG. 6A, the coupling additive 690 includes three functional groups 692 which are shown as —O—R, where R is an alkyl group (e.g., methyl or ethyl). The coupling additive 690 as shown in FIG. 6A is therefore an alkoxy silane coupling additive.

In general, the coupling additive 690 also includes one or more functional groups 694 which interact with the polymer-based coating (e.g., the polymer-based coating 642 of FIG. 6B). In the example of FIG. 6A, the coupling additive 690 includes a functional group 694 which is shown as an organofunctional group X. The organofunctional group X may include a reactive group that forms a bond with a monomer or resin in a coating mixture used to form the coating. Suitable reactive groups include, but are not limited to, vinyl groups, epoxy groups, amino groups, methacryloxy groups, and the like. The functional group 694 may be chemically bonded to the silicon atom by a spacer 696, which may include from 3 to 10 carbon atoms (e.g., the spacer 696 may include a hydrocarbon chain).

FIG. 6B shows an example of a coupling agent 654 in an interphase region 674 between the oxide layer 652 and the coating 642. For example, the coupling agent 654 may be derived from the coupling additive 690 of FIG. 6A. For simplicity, the oxide-based layer 652 and the coating 642 are shown generically without the details of their connection to the coupling agent. Because the coupling agent 654 is derived from the coupling additive, the chemical structure of the coupling agent 654 is typically not identical to that of the coupling additive 690. In some cases, the mechanism of the interaction between the functional groups 692 and the oxide material(s) of the oxide-based layer 652 and/or the mechanism of the interaction between the functional groups 694 and the material of the coating 642 may chemically modify the coupling additive 690. For example, the coupling agent 654 may comprise a residue of the functional groups 692 and/or 694.

As one example, the chemical structure of coupling agent 654 may be produced in part by hydrolyzation of the alkoxy groups 692. The resulting silanol groups can coordinate with hydroxyl groups on the surface of the oxide-based layer an elimination of water can form a chemical bond between the coupling agent 654 and the oxide-based layer 652. In addition, a coupling agent 654 having a network structure can be formed by condensation between adjacent coupling additive molecules. The network may form a distinct layer in the interphase region. Interpenetration of the molecules of the coating into such a network can also contribute to the interaction between the coupling agent 654 and the coating 642. Further, reaction of the functional group 694 with a monomer or resin of the coating mixture can form a chemical bond between the coupling agent 654 and the polymer of the coating. The example of FIG. 6B is not limited to the type of coupling additive and interactions shown.

Figure 7:
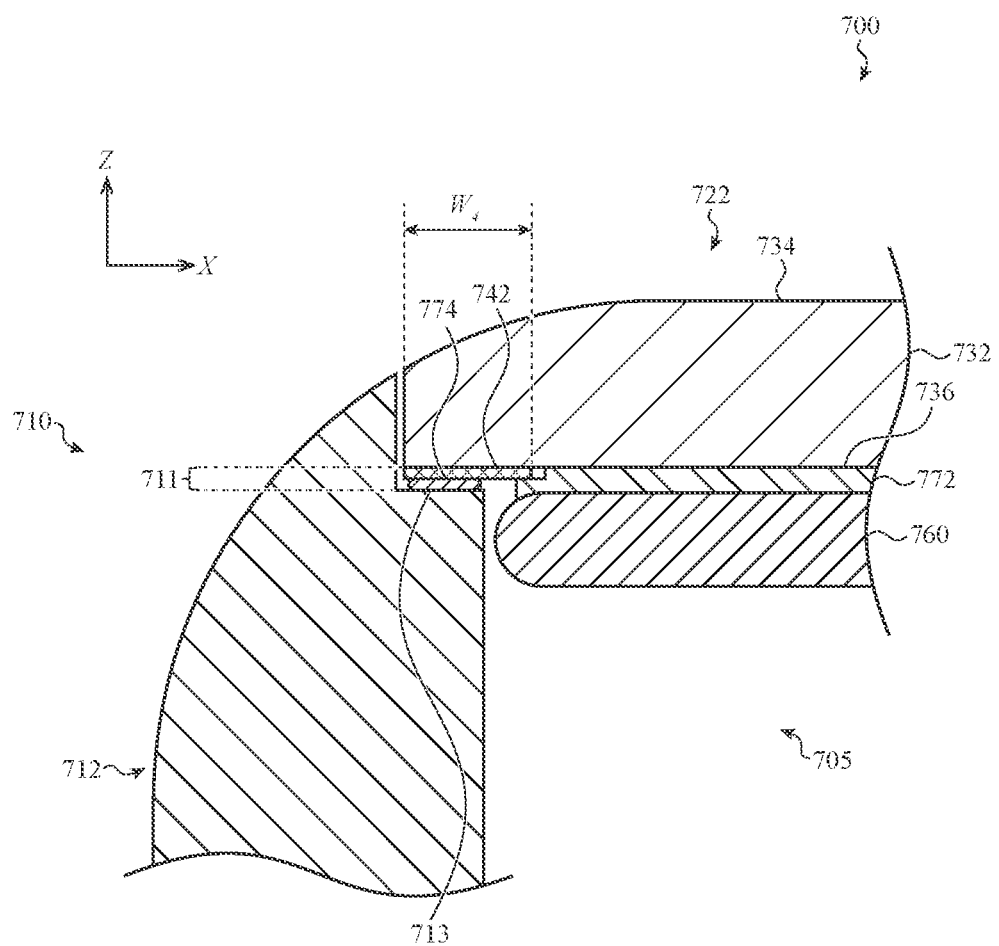
FIG. 7 shows a partial cross-section view of a cover assembly coupled to a housing member.

FIG. 7 shows a partial cross-section view of an electronic device 700. As shown in FIG. 7, the cover assembly 722 includes a cover member 732 and a coating 742 along a portion of an interior surface 736 of the cover member 732. The coating 742 defines a width $W_4$ which is less than a lateral dimension of the cover member 732. In some cases, the width $W_4$ may be from about 0.5 mm to about 5 mm, or from 1 mm to about 3 mm. An adhesion layer is provided between the cover member 732 and at least a portion of the coating 742. The description of the adhesion layer provided with respect to detail views of FIGS. 4-6B is generally applicable herein and, for brevity, is not repeated here. The cover member 732 further defines an exterior surface 734.

The electronic device 700 further includes a display assembly 760 within an interior cavity 705 of the electronic device. The display assembly 760 includes a display and may also include a touch sensor, a force sensor, or a combination thereof. The display assembly 760 may be similar to the display assembly 160 of FIG. 1A and, for brevity, that description is not repeated here.

As shown in FIG. 7, the display assembly 760 is positioned below the cover member 732. In addition, the display assembly 760 is positioned so that at least a portion of the coating 742 is between the cover member 732 and the display assembly 760. In other words, at least a portion of the display assembly 760 is underneath the coating 742 (along the Z direction). When the coating 742 is opaque, the coating 742 may thus obscure or mask this portion of the display assembly 760 from view from above (through the cover member 732). The display assembly 760 may be coupled to the cover assembly 722 with an adhesive 772. In particular, the display assembly 760 may be coupled to a portion of the interior surface 736 of the cover member 732 which is free of the coating 742 (although this portion of the interior surface 736 may include at least a portion of the adhesion layer, such as an oxide-based layer). The adhesive 772 may be a polymer-based adhesive, such as a pressure sensitive adhesive, and may be optically clear.

As shown in FIG. 7, the cover assembly 722 may be coupled to a housing member 712 of the enclosure 710. In some embodiments, a coupling structure 711 (which may also be referred to as a joint) is formed between the cover member 732 and the housing member 712. The coupling structure 711 may include the adhesion layer (e.g., the adhesion layer 950 shown in the detail view of FIG. 9), the coating 742, and an adhesive 774 between the coating 742 and the housing member 712. In the example of FIG. 7, the adhesive 774 contacts the coating 742 and a ledge 713 formed in the housing member 712. In some cases, the coating 742 may be described as defining a first mounting surface; and the housing member 712 (and the ledge 713) may be described as defining a second mounting surface, with the adhesive 774 coupling the first mounting surface and the second mounting surface. In some cases, the adhesive 774 may include a dye or pigment.

As previously described, an adhesion layer as described herein can provide improved adhesion strength between a cover member comprising a glass ceramic material and a coating. In addition, a coupling structure including an adhesion layer as described herein can provide a higher resistance to entry of water or other fluids than when an adhesion layer is omitted. Methods for measuring adhesion strength and resistance to entry of fluids or particles were previously described with respect to FIG. 4 and, for brevity, that description is not repeated here.

Figure 8:
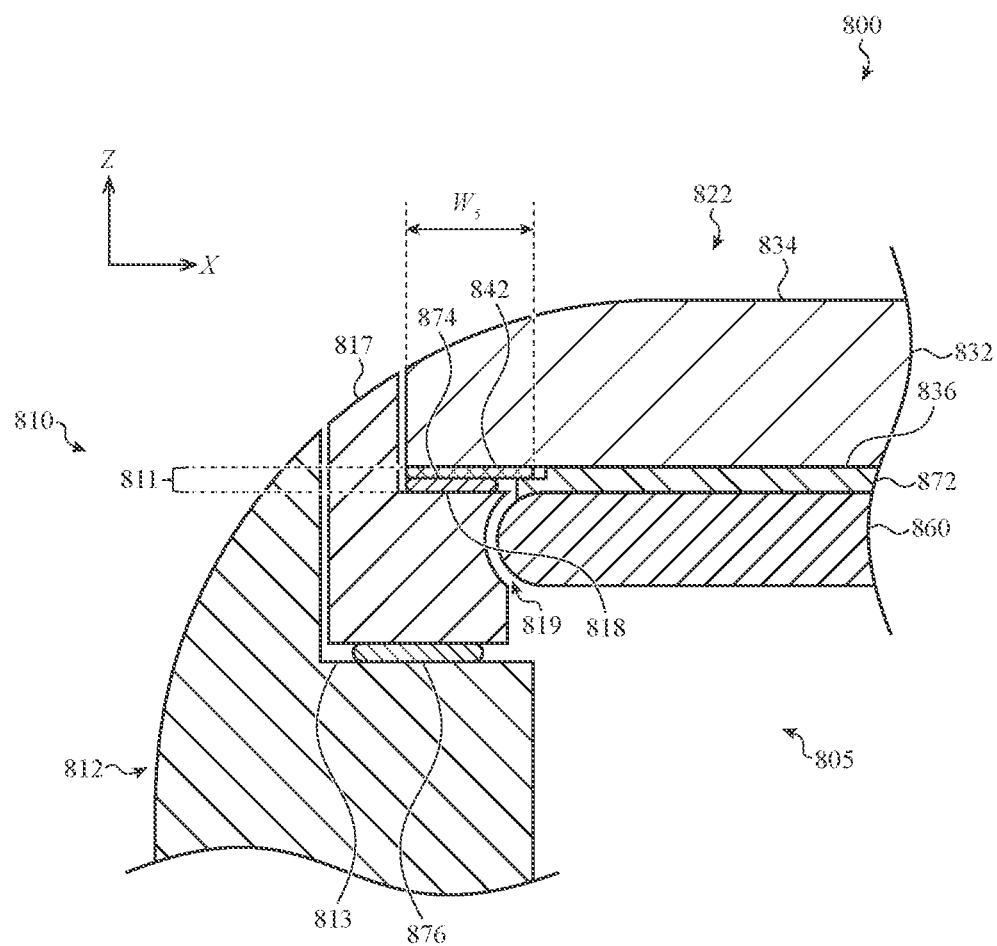
FIG. 8 shows a partial cross-section view of a cover assembly coupled to another housing member.

FIG. 8 shows a partial cross-section view of an electronic device 800. As shown in FIG. 8, the cover assembly 822 includes a cover member 832 and a coating 842 along an interior surface 836 of the cover member 832. The cover member 832 further defines an exterior surface 834.

In the example of FIG. 8, the enclosure 810 includes a first housing member 812 and a second housing member 817. The first housing member 812 may be similar to housing members 112 and 712 of FIGS. 1 and 7 and, for brevity, that description is not repeated here. In some cases, the second housing member 817 may be configured to function as a holder or tray for the cover assembly 822. The second housing member 817 may have a dimension in each of the X and the Z directions that is less than that of the first housing member 812. The enclosure 810 defines an interior cavity 805 of the electronic device 800. The display assembly 860 is positioned within the interior cavity and coupled to the cover member 832 by an adhesive 872.

As shown in FIG. 8, the cover assembly 822 may be coupled to the second housing member 817. In some embodiments, a coupling structure 811 is formed between the cover member 832 and the second housing member 817. The coupling structure 811 may include the adhesion layer (e.g., the adhesion layer 950 shown in the detail view of FIG. 9), the coating 842, and an adhesive 874 between the coating 842 and the second housing member 817. The second housing member 817 may define a ledge 818 configured to receive the cover assembly 822. As shown in FIG. 8, the adhesive 874 contacts the coating 842 and the ledge 818. In some cases, the adhesive 874 may include a dye or pigment.

As shown in FIG. 8, the second housing member 817 is coupled to the first housing member with an adhesive 876. The second housing member 817 may be coupled to a ledge 813 defined by the first housing member 812. In some cases, the second housing member 817 may comprise a polymer or may be polymer-based. In the example of FIG. 8, the second housing member 817 defines a recess 819 and a portion of the display assembly 860 extends into the recess 819. The positioning of the display assembly 860 with respect to the cover member 832 and the coating 842 in FIG. 8 is similar to that shown in FIG. 7 and, for brevity, those details are not repeated here.

FIG. 9 shows a detail view of a coupling structure 911 between a cover member 932 and a housing member 912 of an electronic device 900. The coupling structure is defined by an adhesion layer 950, a coating 942, and an adhesive 974. The coupling structure 911 comprises at least a portion of the adhesion layer 950 and the coating 942, as well as the adhesive 974. The cover member 932, the housing member 912, the adhesion layer 950, the coating 942, and the adhesive 974 may be similar to the housing members, adhesion layers, coatings, and adhesives previously described with respect to FIGS. 1A-8 and, for brevity, that description is not repeated here.

FIG. 10 shows a flow chart of a process 1000 for making a cover assembly. The cover assembly includes a cover member that comprises a glass ceramic material. As referred to herein, a glass ceramic material comprises one or more crystalline phases. Therefore, the glass ceramic is at least partially crystallized. The glass ceramic may further comprise an amorphous (glass) phase. In some cases, an entirely of the cover member comprises the glass ceramic material. In other cases, the glass ceramic material may be allocated to selected regions of the cover member.

As examples, the crystalline phase in the at least partially crystallized glass ceramic comprises from 20% to 90%, from 30% to 90%, from 40% to 90%, from 50% to 90%, from 60% to 90%, from 70% to 90%, from 75% to 95%, or greater than 80% of the at least partially crystallized glass ceramic by volume. The amorphous phase and the crystalline phase together may comprise 90% to 100% of the volume of the glass ceramic cover member. In some cases, the cover member includes a sufficiently high volume percentage of the crystalline phase to be described as a glass ceramic cover member. For example, a glass ceramic cover member may include from 50% to 90%, from 60% to 90%, from 70% to 90%, from 75% to 95%, or greater than 80% of the crystalline phase by volume. Typically, at least some of the crystalline phase (crystals) is located at one or more surfaces of the cover member.

By the way of example, the glass ceramic may be an alkaline silicate, an alkaline earth silicate, an aluminosilicate, a boroaluminosilicate, a perovskite-type glass ceramic, a silicophosphate, an iron silicate, a fluorosilicate, a phosphate, or another glass ceramic composition system. In some embodiments, the glass ceramic portion comprises an aluminosilicate glass ceramic or a boroaluminosilicate glass ceramic. As used herein, an aluminosilicate glass ceramic includes the elements aluminum, silicon, and oxygen, but may further include other elements. Similarly, a boroaluminosilicate glass ceramic includes the elements boron, aluminum, silicon, and oxygen, but may further include other elements. Aluminosilicate and boroaluminosilicate glass ceramics may further include monovalent or divalent ions which compensate charges due to introduction of aluminum ions in the glass ceramic. For example, an alkali aluminosilicate may include alkali metal ions which compensate for the inclusion of aluminum ions in the glass ceramic.

A lithium aluminosilicate (LAS) glass ceramic may be formed from a lithium aluminosilicate glass. For example, the lithium aluminosilicate glass may comprise from 60 wt % to 90 wt % $SiO_2$, from 5 wt % to 30 wt % $Al_2O_3$, and from 2 wt % to 15 wt % $Li_2O$. The lithium aluminosilicate glass may also comprise a relatively small amount (e.g., a few percent by weight) of a nucleating agent such as $TiO_2$, $ZrO_2$, and/or $SnO_2$. The lithium aluminosilicate glass may also comprise a relatively small amount of one or more alkaline earth oxides or one or more alkali metal oxides other than lithium oxide. Lithium aluminosilicate glasses can form several types of crystals, including β quartz solid solution crystals, β spodumene solid solution crystals, and keatite solid solution crystals. The resulting crystals may have a coefficient of thermal expansion which is close to zero or even less than zero. The crystals may be small enough so that the cover member is substantially transparent to visible radiation. For example, the cover member may have a transmittance of at least 75%, 80%, 90%, or 95% for light in the visible spectrum. In addition, the cover member may have a limited amount of transmissive haze. The transmissive haze may relate to the amount of light subject to wide angle scattering (e.g., greater than 2.5 degrees) and may be measured according to ASTM or ISO standards. As non-limiting examples, the transmissive haze may be measured using a haze-gard i device available from BYK or a GC 5000L variable photometer available from Nippon Denshoku. The transmissive haze may be measured for the cover assembly or glass cover member as removed from the electronic device. In some cases, the transmissive haze may be less than or equal to about 40%, less than or equal to about 30%, less than or equal to 20%, less than or equal to 10%, less than or equal to 5%, such as less than 2%, less than or equal to 1.5%, or less than or equal to 1%. When a hazy effect is desired, the transmissive haze may be greater than or equal to about 50%, greater than or equal to about 60%, or greater than or equal to about 70%.

In some embodiments, the glass ceramic material is ion-exchangeable and the cover member comprising the glass ceramic material is chemically strengthened through an ion-exchange operation. The ion-exchange operation may comprise an operation of exchanging first ions in a surface region of the cover member with second ions. The first ions have a first size and the second ions have a second size larger than the first size. The first ions may be exchanged for the second ions by immersing the member in a bath comprising the second ions. For example, the exchange of ions may form an ion exchange layer which extends to an exchange depth less than a thickness of the glass portion of the member. Each of the first ions and the second ions may be alkali metal ions. In embodiments, lithium ions may be exchanged with sodium or potassium ions and/or sodium ions may be exchanged with potassium ions.

After an ion-exchange operation, the glass ceramic material typically includes an ion exchanged region and a region which has not been substantially ion exchanged. For example, the ion-exchanged region may be depleted with respect to first alkali metal ions and enriched with respect to second alkali metal ions. The ion exchanged region may extend to depth D from a surface of the cover member. The ion exchange may occur in the glass phase or in some cases may occur in the ceramic phase or a combination of the glass phase and the ceramic phase. In some examples, an ion-exchanged region may be formed along front and rear surfaces of the cover member, as well as side surfaces of the cover member.

The exchange of larger alkali metal ions for smaller alkali metal ions can create a compressive stress region in the ion-exchanged region. The compressive stress region can extend to a depth of layer (DoL) from the surface of the cover member. When ion-exchanged regions are formed from opposing surfaces of the cover member, a tensile stress region is typically formed between the compressive stress regions.

As shown in FIG. 10, the process 1000 includes an operation 1002 of forming an oxide-based layer on the cover member. For example, the oxide-based layer is formed on an interior surface of the cover member (facing the interior cavity of the enclosure). In some cases, a substantial entirety of the interior surface of the cover member may be covered by the oxide-based layer. As previously discussed, the oxide-based layer may have a thickness from 2 nm to 50 nm, from 5 nm to 20 nm, or from 10 nm to 30 nm.

The oxide-based layer may be formed using a chemical deposition technique or a physical vapor deposition technique. Chemical deposition techniques include, but are not limited to, chemical vapor deposition techniques and sol-gel techniques. Physical deposition techniques include, but are not limited to, evaporation techniques and sputtering techniques. In some embodiments, the temperatures used in the operation 1002 are kept sufficiently low that ion-exchanged region(s) previously formed within the cover member are not significantly affected (e.g., by diffusion of ions). For example, plasma-enhanced chemical vapor deposition (PECVD), sputter deposition, or sol-gel techniques may be used at temperatures less than about 300° C.

In some cases, the technique used to form the oxide-based layer may influence the composition and/or the structure of the oxide-based layer. For example, oxide-based layers formed using a sol-gel process may include residual carbon from the precursors used in the oxide material. In some cases, an oxide-based layer formed using a sol-gel process may also have a lower density (greater porosity) than an oxide-based layer formed using a physical vapor deposition process. The description of oxide-based layer compositions provided with respect to FIG. 4 is generally applicable herein, and, for brevity, is not repeated here.

In some cases, the cover member may be treated before the oxide-based layer is formed. For example, the cover member may be cleaned and/or plasma treated before the oxide-based layer is deposited. In addition, the cover member may be polished or otherwise textured to produce a desired level of roughness before the oxide-based layer is deposited. For example, the amplitude (e.g., root mean square height Sq) of the roughness may be from 2 nm to 2 microns, from 2 nm to 100 nm, from 5 nm to 200 nm, or from 10 nm to 300 nm.

As shown in FIG. 10, the process 1000 includes an operation 1004 of applying a coating mixture to the oxide-based layer. The coating mixture may include a polymerizable component such as a monomer, an oligomer, a prepolymer, or combinations thereof. The polymerizable component may include an ester group, an epoxy group, a urethane-group, or the like. The coating mixture also includes a coupling additive. Suitable coupling additives include, but are not limited to, silane-based coupling additives. In some cases, the silane-based coupling additive is an alkoxy silane such as a dialkoxy or trialkoxy silane. An example of a trialkoxy silane coupling additive is shown in FIG. 6A. The alkoxy silane may be a methoxy or ethoxy silane. The coating mixture may also include one or more additional additives such as a colorant, an extender, a diluent, a polymerization initiator, or a stabilizer.

The process 1000 further includes an operation 1006 of forming a coating layer on the oxide-based layer with the coupling agent in the interphase region. During operation 1006 at least a portion of the coupling additive may segregate to the surface of the oxide-based layer and interact with the oxide-based layer. The coupling additive may also interact with the polymerizable components of the coating mixture as described in further detail with respect to FIGS. 6A and 6B. As previously described, the coupling additive may be modified by these interactions, thereby forming a coupling agent which differs in chemical structure from the coupling additive.

The operation 1006 also typically includes polymerizing one or more polymerizable components of the coating mixture to form the polymer of the coating layer. For example, the polymerizable component(s) may include a monomer, an oligomer, or combinations thereof. The polymerization of the polymerizable components may be assisted by heat, light, or the like.

In some cases, the process 1000 may also include an operation of forming an additional coating, such as an anti-reflective coating and/or a smudge-resistant coating on an exterior surface of the cover member. For example, the smudge-resistant coating may include a hydrophobic or oleophobic coating such as a fluoropolymer coating. The coating(s) on the exterior surface may be formed after the coating(s) on the interior surface.

The description of glass ceramic materials, oxide-based layers, coupling additives, and coatings provided herein with respect to FIG. 10 applies more generally to the cover assemblies described herein, including at least the cover assemblies of FIGS. 1A-9.

Figure 11:
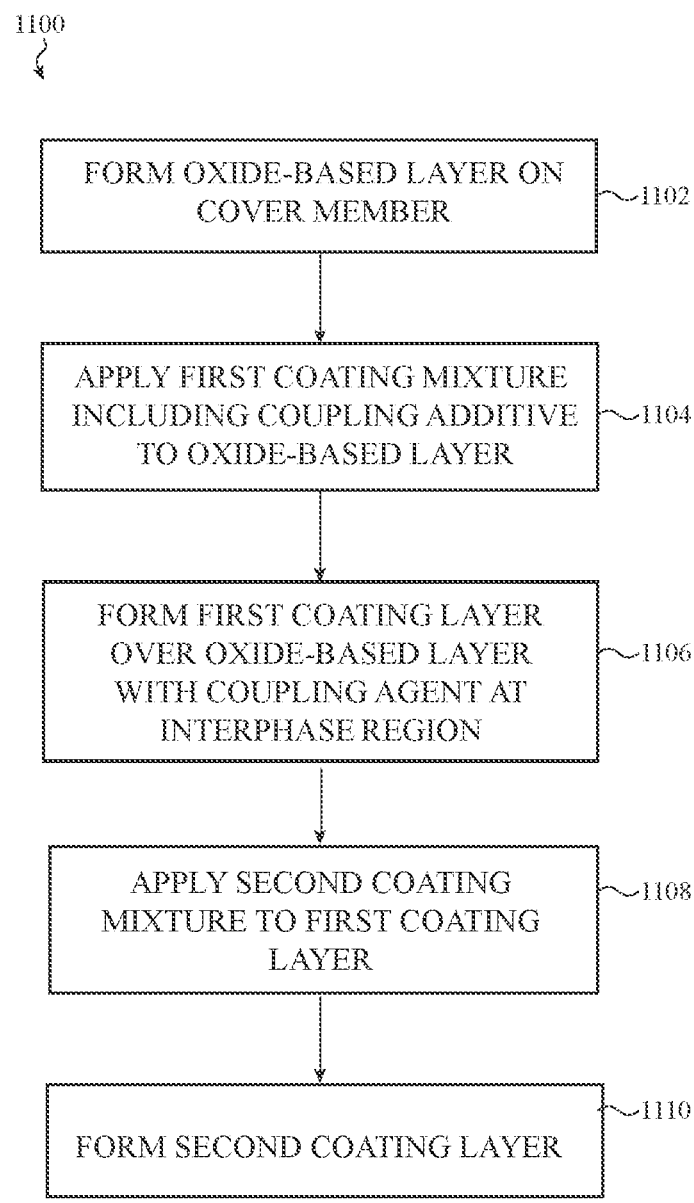
FIG. 11 shows a flow chart of an additional process for making a cover assembly.

FIG. 11 is a flow chart of a process 1100 for making a cover assembly. The process 1100 includes an operation 1102 of forming an oxide-based layer on the cover member. The process 1100 also includes an operation 1104 of applying a first coating mixture to the oxide-based layer. The process 1100 further includes an operation 1106 of forming a first coating layer on the oxide-based layer. Operations 1102, 1104, and 1106 may be similar to operations 1002, 1004, and 1006 of process 1000 and for brevity that description is not repeated here.

The process 1100 further includes an operation 1108 of applying a second coating mixture to the first coating layer. In some cases the second coating mixture need not include the coupling additive and therefore may be different than the first coating mixture. In addition, the process 1100 includes an operation 1110 of forming a second coating layer. The operation 1110 typically includes polymerizing the polymerizable components of the second coating mixture to form the polymer of the second coating layer. The polymerizable component, additives, and polymerization conditions may be similar to those described with respect to FIG. 9 and for brevity that description is not repeated here. Operations 1108 and 1110 may be repeated to form additional coating layers as desired.

Figure 12:
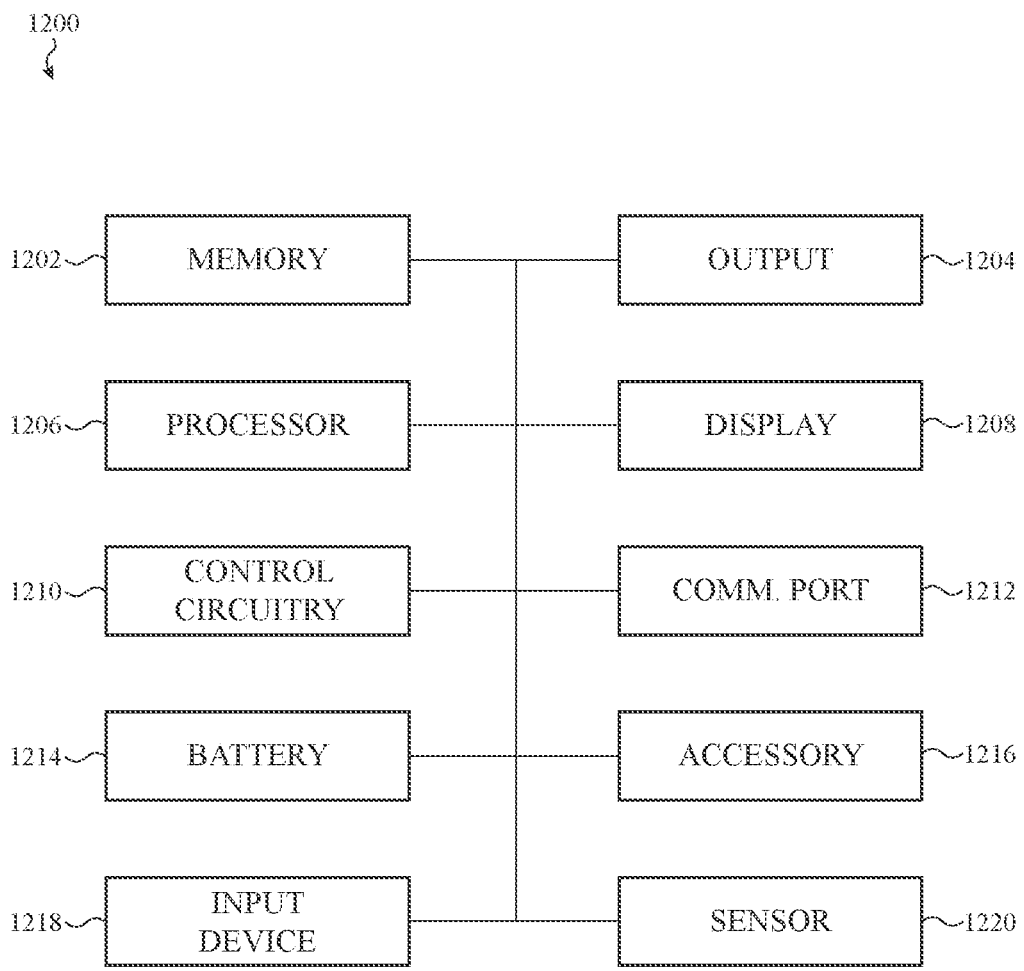
FIG. 12 shows a block diagram of components of an electronic device.

FIG. 12 shows a block diagram of a sample electronic device that can incorporate a cover assembly as described herein. The schematic representation depicted in FIG. 12 may correspond to components of the devices depicted in FIG. 1A-11 as described above. However, FIG. 12 may also more generally represent other types of electronic devices with cover assemblies as described herein.

In embodiments, an electronic device 1200 may include sensors 1220 to provide information regarding configuration and/or orientation of the electronic device in order to control the output of the display. For example, a portion of the display 1208 may be turned off, disabled, or put in a low energy state when all or part of the viewable area of the display 1208 is blocked or substantially obscured. As another example, the display 1208 may be adapted to rotate the display of graphical output based on changes in orientation of the device 1200 (e.g., 90 degrees or 180 degrees) in response to the device 1200 being rotated.

The electronic device 1200 also includes a processor 1206 operably connected with a computer-readable memory 1202. The processor 1206 may be operatively connected to the memory 1202 component via an electronic bus or bridge. The processor 1206 may be implemented as one or more computer processors or microcontrollers configured to perform operations in response to computer-readable instructions. The processor 1206 may include a central processing unit (CPU) of the device 1200. Additionally, and/or alternatively, the processor 1206 may include other electronic circuitry within the device 1200 including application specific integrated chips (ASIC) and other microcontroller devices. The processor 1206 may be configured to perform functionality described in the examples above.

The memory 1202 may include a variety of types of non-transitory computer-readable storage media, including, for example, read access memory (RAM), read-only memory (ROM), erasable programmable memory (e.g., EPROM and EEPROM), or flash memory. The memory 1202 is configured to store computer-readable instructions, sensor values, and other persistent software elements.

The electronic device 1200 may include control circuitry 1210. The control circuitry 1210 may be implemented in a single control unit and not necessarily as distinct electrical circuit elements. As used herein, "control unit" will be used synonymously with "control circuitry." The control circuitry 1210 may receive signals from the processor 1206 or from other elements of the electronic device 1200.

As shown in FIG. 12, the electronic device 1200 includes a battery 1214 that is configured to provide electrical power to the components of the electronic device 1200. The battery 1214 may include one or more power storage cells that are linked together to provide an internal supply of electrical power. The battery 1214 may be operatively coupled to power management circuitry that is configured to provide appropriate voltage and power levels for individual components or groups of components within the electronic device 1200. The battery 1214, via power management circuitry, may be configured to receive power from an external source, such as an alternating current power outlet. The battery 1214 may store received power so that the electronic device 1200 may operate without connection to an external power source for an extended period of time, which may range from several hours to several days.

In some embodiments, the electronic device 1200 includes one or more input devices 1218. The input device 1218 is a device that is configured to receive input from a user or the environment. The input device 1218 may include, for example, a push button, a touch-activated button, a capacitive touch sensor, a touch screen (e.g., a touch-sensitive display or a force-sensitive display), a capacitive touch button, a dial, a crown, or the like. In some embodiments, the input device 1218 may provide a dedicated or primary function, including, for example, a power button, volume buttons, home buttons, scroll wheels, and camera buttons.

The device 1200 may also include one or more sensors 1220, such as a force sensor, a capacitive sensor, an accelerometer, a barometer, a gyroscope, a proximity sensor, a light sensor, or the like. The sensors 1220 may be operably coupled to processing circuitry. In some embodiments, the sensors 1220 may detect deformation and/or changes in configuration of the electronic device and be operably coupled to processing circuitry which controls the display based on the sensor signals. In some implementations, output from the sensors 1220 is used to reconfigure the display output to correspond to an orientation or folded/unfolded configuration or state of the device. Example sensors 1220 for this purpose include accelerometers, gyroscopes, magnetometers, and other similar types of position/orientation sensing devices. In addition, the sensors 1220 may include a microphone, an acoustic sensor, a light sensor, an optical facial recognition sensor, or other types of sensing device.

In some embodiments, the electronic device 1200 includes one or more output devices 1204 configured to provide output to a user. The output device 1204 may include a display 1208 that renders visual information generated by the processor 1206. The output device 1204 may also include one or more speakers to provide audio output. The output device 1204 may also include one or more haptic devices that are configured to produce a haptic or tactile output along an exterior surface of the device 1200.

The display 1208 may include a liquid-crystal display (LCD), a light-emitting diode (LED) display, an LED-backlit LCD display, an organic light-emitting diode (OLED) display, an active layer organic light-emitting diode (AMOLED) display, an organic electroluminescent (EL) display, an electrophoretic ink display, or the like. If the display 1208 is a liquid-crystal display or an electrophoretic ink display, the display 1208 may also include a backlight component that can be controlled to provide variable levels of display brightness. If the display 1208 is an organic light-emitting diode or organic electroluminescent-type display, the brightness of the display 1208 may be controlled by modifying the electrical signals that are provided to display elements. In addition, information regarding configuration and/or orientation of the electronic device may be used to control the output of the display as described with respect to input devices 1218. In some cases, the display is integrated with a touch and/or force sensor in order to detect touches and/or forces applied along an exterior surface of the device 1200.

The electronic device 1200 may also include a communication port 1212 that is configured to transmit and/or receive signals or electrical communication from an external or separate device. The communication port 1212 may be configured to couple to an external device via a cable, adaptor, or other type of electrical connector. In some embodiments, the communication port 1212 may be used to couple the electronic device to a host computer.

The electronic device 1200 may also include at least one accessory 1216, such as a camera, a flash for the camera, or other such device. The camera may be included in a camera assembly. The camera may be connected to other parts of the electronic device 1200 such as the control circuitry 1210.

As used herein, the terms "about," "approximately," "substantially," "substantially match," "similar," and the like are used to account for relatively small variations, such as a variation of +/- 10%, +/- 5%, +/-2%, or +/-1%. In addition, use of the term "about" in reference to the endpoint of a range may signify a variation of +/-10%, +/-5%, +/-2%, or +/-1% of the endpoint value. In addition, disclosure of a range in which at least one endpoint is described as being "about" a specified value includes disclosure of the range in which the endpoint is equal to the specified value.

The following discussion applies to the electronic devices described herein to the extent that these devices may be used to obtain personally identifiable information data. It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not intended to be exhaustive or to limit the embodiments to the precise forms disclosed. It will be apparent to one of ordinary skill in the art that many modifications and variations are possible in view of the above teachings.

What is claimed is:

1. An electronic device comprising:
   a display; and
   an enclosure including a cover assembly, the cover assembly positioned over the display and comprising:
      a cover member formed from a glass ceramic material;
      a cosmetic masking layer positioned along an interior surface of the cover member and defining an opening positioned over at least a portion of the display; and
      an adhesion layer including a silicon-based oxide and forming a bond between the glass ceramic material of the cover member and the cosmetic masking layer.

2. The electronic device of claim 1, wherein:
   the cosmetic masking layer includes a pigment dispersed within a polymer matrix; and
   the polymer matrix is chemically bonded to the adhesion layer.

3. The electronic device of claim 1, wherein:
   the enclosure further includes a housing member that is coupled to the cover member by a coupling structure; and
   the coupling structure includes the adhesion layer, the cosmetic masking layer, and an adhesive positioned between the cosmetic masking layer and the housing member.

4. The electronic device of claim 1, wherein the adhesion layer comprises:
   an oxide layer comprising the silicon-based oxide; and
   a coupling agent which couples the oxide layer to the cosmetic masking layer.

5. The electronic device of claim 1, wherein the silicon-based oxide is characterized by the formula $SiO_x$ and x is less than 2.

6. The electronic device of claim 1, wherein:
   the glass ceramic material comprises a lithium aluminosilicate glass ceramic; and
   the silicon-based oxide further comprises aluminum.

7. The electronic device of claim 1, wherein the glass ceramic material includes at least 50 percent by volume of a crystalline phase.

8. An electronic device comprising:
   an enclosure defining an interior cavity of the electronic device, the enclosure including a cover assembly comprising:
      a cover member comprising a glass ceramic material;
      an opaque polymer-based layer along a peripheral interior surface of the cover member;
      an oxide-based layer between the cover member and the opaque polymer-based layer; and
      a coupling agent between the oxide-based layer and the opaque polymer-based layer, and
   a display, at least a portion of the display positioned under the cover member and within the interior cavity.

9. The electronic device of claim 8, wherein the coupling agent bonds with each of the oxide-based layer and the opaque polymer-based layer.

10. The electronic device of claim 9, wherein the coupling agent forms a chemical bond with at least one of the oxide-based layer and the opaque polymer-based layer.

11. The electronic device of claim 9, wherein the coupling agent is silane-based.

12. The electronic device of claim 9, wherein:
the cover assembly defines an interphase region between the oxide-based layer and the opaque polymer-based layer; and
the coupling agent forms a distinct layer in the interphase region.

13. The electronic device of claim 8, wherein the oxide-based layer is a silicon oxide-based layer.

14. The electronic device of claim 8, wherein the oxide-based layer has a thickness from 2 nm to 30 nm.

15. An electronic device comprising:
an enclosure including a cover assembly, the cover assembly defining an exterior surface of the electronic device and comprising:
a glass ceramic cover member;
a polymeric layer positioned along an interior surface of the glass ceramic cover member; and
an adhesion layer comprising:
an oxide-based layer positioned between the glass ceramic cover member and the polymeric layer and directly adhered to the glass ceramic cover member; and
a coupling agent directly adhered to each of the oxide-based layer and the polymeric layer.

16. The electronic device of claim 15, wherein:
the electronic device further comprises a display;
the polymeric layer defines a central opening positioned over at least a portion of the display;
the oxide-based layer spans the central opening defined by the polymeric layer;
the adhesion layer is transparent to visible light; and
the display is viewable through the central opening.

17. The electronic device of claim 15, wherein the cover assembly defines a rear surface of the electronic device.

18. The electronic device of claim 15, wherein the polymeric layer has a thickness from 10 microns to 100 microns.

19. The electronic device of claim 15, wherein the coupling agent chemically bonds to the polymeric layer.

20. The electronic device of claim 15, wherein:
the polymeric layer defines a first mounting surface; and
the enclosure further comprises:
a housing member defining a second mounting surface; and
an adhesive coupling the first mounting surface and the second mounting surface.

* * * * *